United States Patent

Miller

[15] 3,673,858
[45] July 4, 1972

[54] TUBE TESTING APPARATUS

[72] Inventor: Charlie D. Miller, Syracuse, N.Y.

[73] Assignee: Carrier Corporation, Syracuse, N.Y.

[22] Filed: Jan. 29, 1971

[21] Appl. No.: 110,986

[52] U.S. Cl. .......................................... 73/40.5 R, 73/49.1
[51] Int. Cl. ........................................................ G01m 3/28
[58] Field of Search ................... 73/40.5, 49.1, 49.2, 49.3, 73/49.4, 40, 49.5, 37

[56] References Cited

UNITED STATES PATENTS 3,012,433  12/1961  Blafield ............................. 73/40.5 R

FOREIGN PATENTS OR APPLICATIONS 835,231  5/1960  Great Britain ..................... 73/40.5 R
150,280  2/1961  U.S.S.R. ............................. 73/40.5 R Primary Examiner—Louis R. Prince
Assistant Examiner—Denis E. Corr
Attorney—Harry G. Martin, Jr. and J. Raymond Curtin

[57] ABSTRACT

The test pump cylinder is formed with an inner smaller bore merging with a larger outer bore. The piston is dimensioned for close sliding fit with the smaller inner bore. A piston ring is mounted on the outer end portion of the piston and the piston has a greater axial length than the length of the outer enlarged bore, whereby the inner portion of the piston is always positioned in the smaller inner bore. The piston is formed with a passage extending from the inner end thereof and terminating inwardly of the piston ring for communication with the annular space encircling the outer end of the piston when the same is in outermost position. A liquid supply line is connected to the annular space for initially supplying liquid flow through the passage and the inner smaller bore of the cylinder, into the tube under test to fill the same. The piston is moved inwardly moving the piston ring into the inner smaller cylinder bore, to apply pressure on the tube, by a screw threaded in the outer closed end of the cylinder.

5 Claims, 4 Drawing Figures

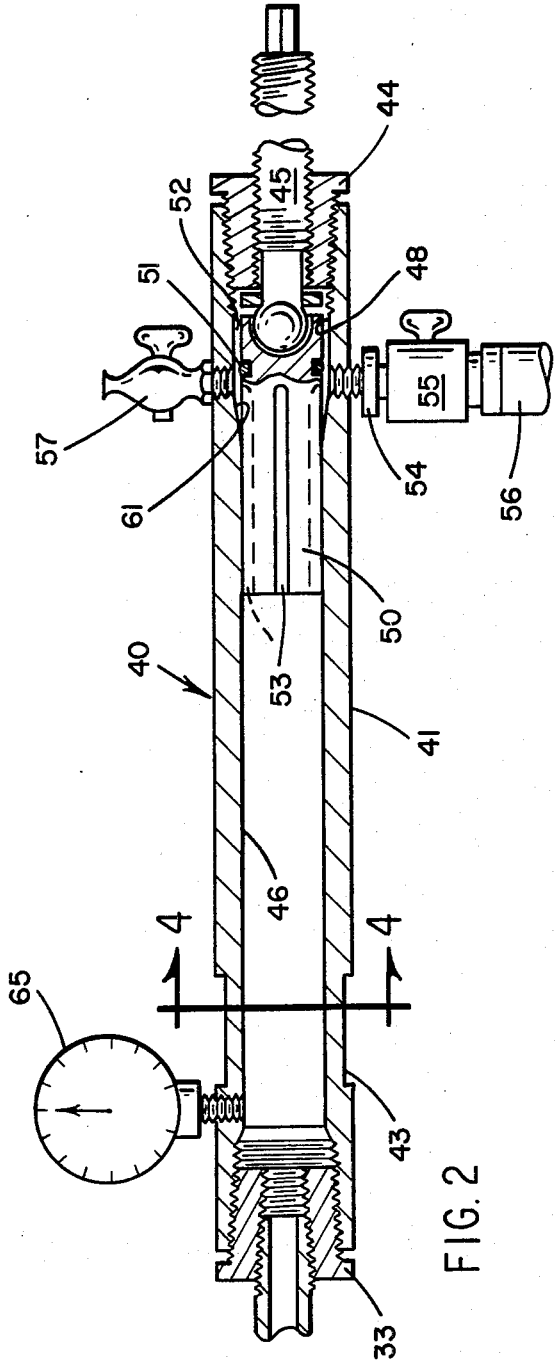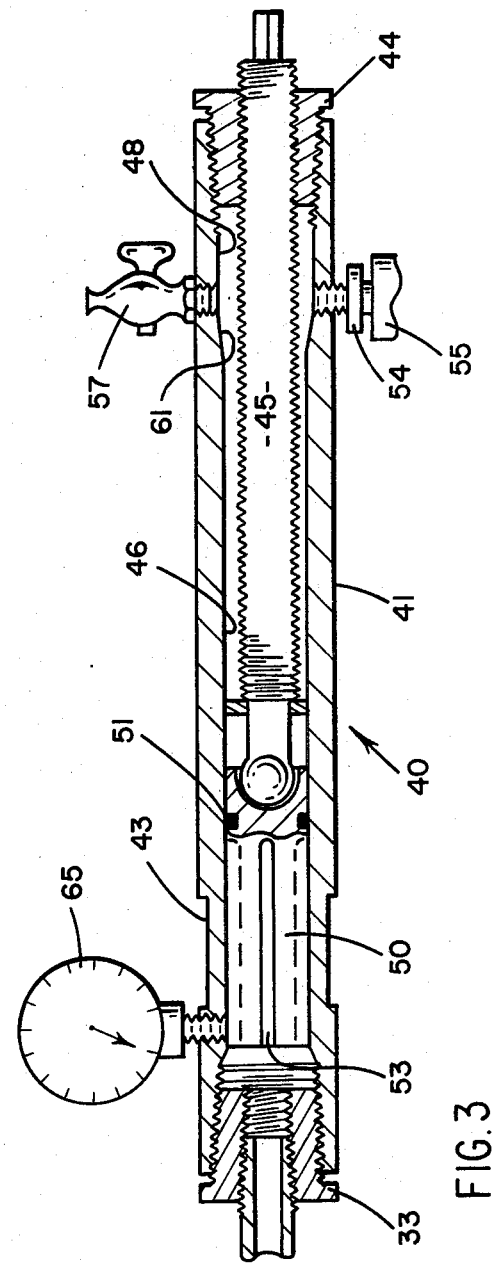
FIG. 2
FIG. 3
INVENTOR.
CHARLIE D. MILLER
ATTORNEY

TUBE TESTING APPARATUS

BACKGROUND OF THE INVENTION

On occasion it is necessary to test tubes to determine if a leak has occurred therein, as for example, the tubes enclosed in the shell of a heat exchanger. If the heat exchanger is in the form of a condenser or an evaporator in a refrigeration or air conditioning system, even a minute leak can adversely affect the operation of the machine. Leaks in such apparatus result in the loss of refrigerant and also in contamination thereof.

It is accordingly desirable to immediately detect a leaking tube in order that it may be replaced. It is very expensive to remove and replace a tube. It is therefore important to make certain a tube is leaking before replacing it. The heat exchanger units in air conditioning systems of large capacity contain over four thousand tubes.

At present, various methods are employed to ascertain which tubes in a bundle may be leaking. Various types of apparatus including electronic leak detectors are employed, however, such methods are inconclusive especially when the leak is small. Accordingly, often when a suspected tube is removed, it is found to be in good condition. On the other hand tubes, according to the test method, thought to be in good condition are in fact defective.

Heretofore, tubes have been tested by applying hydraulic pressure to the tube. In testing tubes in heat exchanger apparatus in air conditioning systems and the like, the testing is done in the field, and it is particularly difficult and inconvenient and time consuming to employ heavy bulky power operated pump mechanisms for pressurizing the tubes in the field.

My invention has as an object, tube testing apparatus including a pump mechanism embodying a small, light-weight structure which the serviceman can carry in his tool kit and by which the tubes and pump structure can be quickly and conveniently completely filled with liquid, and the tubes pressurized to a high level. The pump mechanism is manually operated, not requiring a source of power.

SUMMARY OF THE INVENTION

The testing apparatus of my invention consists of closure members having passages extending therethrough, and being attachable in liquid tight relation to the opposite ends of a tube to be tested. One of the members is provided with means for closing the passage therein. A high pressure hydraulic pump mechanism is attached to the other enclosure member.

The pump mechanism consists of a cylinder in which a piston is moved axially by a screw threaded through the outer closed end of the cylinder. The outer portion of the cylinder bore is enlarged. The piston is dimensioned to fit the inner smaller portion of the bore and has a length exceeding the length of the outer enlarged bore. Accordingly, the inner end of the piston is always positioned in the smaller inner bore. A piston ring, which may consist of a conventional O-ring, is mounted on the outer end portion of the piston which is encircled by an annular space provided by the enlarged bore when the piston is in outermost position. A liquid supply line is connected to the annular space and the piston has a passage, the outer end of which is spaced inwardly of the O-ring and the inner end of the passage communicates with the inner bore of the cylinder for flow of liquid from the annular space into the tube to fill the same. Upon inward movement of the piston, the O-ring is guided into the smaller bore by a conical surface connecting the inner and outer bore portions.

BRIEF DESCRIPTION OF THE DRAWINGS

FIG. 2 is an enlarged sectional view of the pump mechanism with the piston in the outermost position.

FIG. 3 is a view similar to FIG. 2 showing the pump piston moved to the inner end of the cylinder.

FIG. 4 is a view taken on line 4-4 of FIG. 2.

DESCRIPTION OF THE PREFERRED EMBODIMENT

Figure 1:
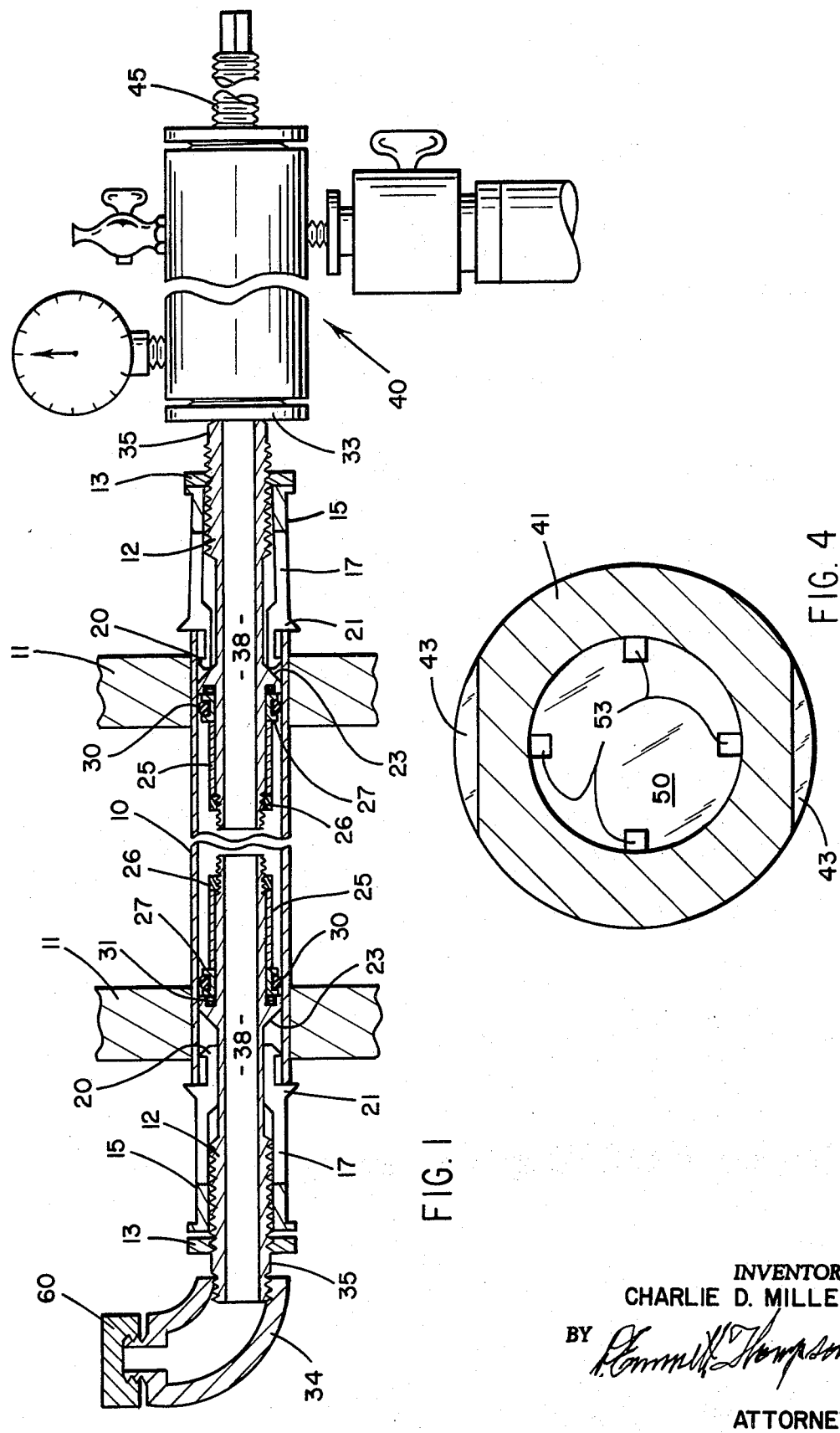
FIG. 1 is a view illustrating the apparatus embodying my invention applied to a tube under test, the tube and closures being shown in section, the pump mechanism in elevation.

Ten designates the tube under test. The end portions of the tube are expanded in tube sheets 11 in conventional manner. The apparatus includes a closure attached to each end of the tube under test. The closures consist of plug members 12 threaded externally at their outer end portions to receive nuts 13.

A collet member 15 is slidably mounted on the plugs 12 and is formed with spring fingers 17, the inner ends of which are formed with outwardly extending barbs 20. The fingers 17 are also formed with projections 21 for engaging the end edges of the tube 10.

The plug 12 is also formed with a conical cam surface 23. A sleeve 25 is slidably mounted on the inner end of each plug and is engaged by a nut 26 threaded on the inner end of the plug. A collar 27 is slidably mounted on the plug and is positioned between the sleeve 25 and the cam portion 23. The collar 27 is formed in its periphery with a circumferentially extending groove to receive a sealing ring 30. The inner radial end surface of the cam portion 23 is also formed with a circular groove to receive a sealing ring 31.

The plug assemblies are inserted into the ends of the tube 10. The outer end of each plug is threaded to receive a coupling 33 or a closure member 34. The plugs are formed with flats 35 for the reception of a wrench to restrain rotation of the plugs while the nuts 13 are threaded along the plugs for engagement with the outer ends of the collet members 15. As previously stated, the fingers 17 of the collet members 15 are formed with the projections 21 engaging the ends of the tube 10. As the nut 13 is tightened, the plug is drawn outwardly in the collet moving the cam surface 23 into engagement with the inner ends of the collet fingers 17 expanding them outwardly and moving the barbs 20 into interlocking engagement with the bore of the tube, whereby the plug assemblies are restrained against outward movement from the tube when the same is pressurized. The sealing rings 30,31 form a sealing engagement with the tube.

The plug members are formed with axially extending passages 38. The collet fingers 17 in the plug assembly shown at the right in FIG. 1 are expanded into locking engagement with the tube 10. In the assembly shown at the left of FIG. 1, the nut 13 has not been run against the collet member 15. However, it will be understood that this plug assembly is also locked and sealed in the tube prior to making the test.

While the plug closure structure described has proven to be convenient to use, and efficient in operation, it will be apparent that plug members involving other structural arrangements may be employed.

The tube is pressurized by a pump mechanism 40 attached to one of the closure plugs by the coupling 33. Referring to FIG. 2, the pump mechanism 40 is shown in lengthwise section; a portion of the piston being shown in elevation. The pump body 41 is of cylindrical form and is provided with flats 43 for the reception of a wrench to thread the pump body on the coupling 33. The outer end of the cylinder 41 is provided with a closure 44 having a threaded bore to receive an actuating screw 45. The major portion 46 of the cylinder bore is of uniform diameter and extends from the inner end of the cylinder outwardly and merges with an enlarged outer bore portion 48.

A piston 50 is dimensioned for a close sliding fit with the inner bore portion 46. A piston ring 51 is mounted on the outer portion of the piston, and is preferably in the form of an O-ring. The axial length of the piston 50 is substantially greater than the length of the enlarged bore portion 48. In FIG. 2, the piston is shown in the outermost position. In this position a substantial portion of the piston extends into the inner bore 46. The piston is formed with passage means affording communication between the annular area 52 about the outer end of the piston, formed by the enlarged bore 48. The passage means is conveniently provided by forming a plurality of grooves 53 in the periphery of the piston. The grooves 53 extend from the inner end of the piston 50 outwardly and terminate inwardly of the piston ring 51. Accordingly with the piston positioned, as shown in FIG. 2, the outer ends of the grooves 53 communicate with the space 52.

The cylinder 41 is formed with a pair of ports. A fitting 54 is threaded into one of the ports and is connected to a valve 55 which in turn is connected to a liquid supply line 56. A vent valve 57 has threaded connection to the other port. These ports communicate with the area 52.

The valve 55 is opened to provide a flow of liquid into the annular area 52 encircling the outer end portion of the piston. This flow passes through the grooves 53 into the inner end of the cylinder 41, and through the plug member 12, to which the cylinder is attached, and thence into the tube 10. When the tube 10 is filled with liquid, as observed by the discharge of the liquid from the fitting 34, a cap 60 is applied to the fitting. During this flow of liquid, the vent valve 57 is closed.

With the cylinder and tube 10 completely filled with water, the valve 55 is closed, thereupon the screw 45 is threaded inwardly effecting inward movement of the piston 50. As the piston 50 is moved inwardly, the O-ring 51 does not contact the ports to which the valves 55, 57 are connected. The smooth, conical surface 61 guides the piston ring 51 into the straight inner bore portion 46 without any damage to the ring. As the piston ring 51 enters the bore 46, the ring has sealing engagement therewith, preventing back flow of liquid from the cylinder. It will be apparent as the piston 50 is moved inwardly in the cylinder 41, pressure is immediately applied to the tube 10. As soon as the piston ring 51 enters the outer end of the smaller bore 46, the valve 57 is opened to vent the cylinder area behind the piston, to avoid creating a vacuum in that space as the piston moves further into the inner bore 46.

A pressure indicator 65 is connected to the inner end portion of the cylinder for indication of the pressure being built up in the tube 10. After a pressure of predetermined level is established in the tube, as shown by the gauge 65, movement of the piston is stopped. If for a short period the gauge indicates no pressure drop, it means there is no leak in the tube. On the other hand, if the applied pressure does not hold, it is obvious that the tube is defective.

The pump assembly is compact, light in weight, and economical to construct. It is conveniently manually operated for application of high pressure on a tube under test.

While I have described a preferred embodiment of the invention, it is to be understood the invention is not limited thereto since it may be otherwise embodied within the scope of the following claims.

I claim:
1. Apparatus for applying a high-pressure hydrostatic test to tubes comprising a closure adapted to be attached to one end of a tube being tested, said closure being formed with an axial passage extending therethrough, means connected to said closure for opening and closing the passage therein, a manually operated pump assembly including a cylinder closed at the outer end, means for attaching the inner end of said cylinder to the opposite end of said tube, said cylinder being formed with a circular bore communicating with the interior of said tube, the inner portion of said cylinder bore extending outwardly from the inner end of said cylinder and merging with an enlarged outer portion extending to the outer closed end of said cylinder, a piston of uniform diameter mounted in said cylinder bore and having a close sliding fit with the inner portion of said bore, a piston ring mounted on the outer end portion of said piston, said piston having an axial length exceeding the axial length of said enlarged bore, said piston being formed with passage means extending outwardly from the inner end of said piston and terminating inwardly of said piston ring, whereby when the outer portion of said piston is positioned in proximity to the outer closed end of said cylinder, said outer enlarged portion of said bore forms an annular space about the outer end portion of said piston and which annular space communicates with said passage means, said cylinder being formed with a pair of ports communicating with said enlarged bore, a liquid supply line including a control valve being connected to one of said ports, a vent valve connected to the other of said ports, a piston operating screw having threaded engagement with the outer end of said cylinder, the inner end of said screw being operatively connected to said piston, said screw being operable upon being threaded into the outer closed end of said cylinder to move said piston axially through the inner portion of said bore in said cylinder to pressurize said tube.

2. Apparatus as set forth in claim 1 wherein said passage means consists of grooves formed in the peripheral surface of said piston.

3. Apparatus as set forth in claim 1 wherein said cylinder bore is formed with a conical portion intermediate said inner and outer bore portions.

4. Apparatus as set forth in claim 1 wherein said cylinder is formed with an aperture communicating with the inner portion of said cylinder bore, said aperture being spaced outwardly from the inner end of the cylinder a distance less than the spacing of said piston ring from the inner end of said piston and a pressure indicator connected to said aperture.

5. Apparatus as set forth in claim 1 wherein said piston ring consists of an O-ring.

* * * * *